Patented Mar. 31, 1925.

1,531,286

UNITED STATES PATENT OFFICE.

JULIUS HOFFMANN, OF HONGG, NEAR ZURICH, SWITZERLAND.

PROCESS FOR THE MANUFACTURE OF 1-PHENYL-2.3-DIMETHYL-4-DIMETHYLAMINO-5-PYRAZOLONE.

No Drawing.  Application filed November 11, 1922. Serial No. 600,198.

*To all whom it may concern:*

Be it known that I, JULIUS HOFFMANN, a citizen of Switzerland, and a resident of Hongg, near Zurich, Switzerland, have invented certain new and useful Improvements in a Process for the Manufacture of 1-Phenyl-2.3-Dimethyl-4-Dimethylamino-5-Pyrazolone, of which the following is a specification.

My invention relates to a process for the manufacture of 1-phenyl-2.3-dimethyl-4-dimethylamino-5-pyrazolone which consists in allowing formaldehyde in the presence of formic acid to act upon 1-phenyl-2.3-dimethyl-4-sulphamino-5-pyrazolone.

K. Hess (Berichte der Deutschen Chemischen Gesellschaft, vol. 48 (1915) (page 1888) has shown, that the usual methylating agents, such methyliodide, methylchloride, etc., may in many cases be advantageously substituted by formaldehyde used in the presence of formic acid. This process may also be employed with good success for methylating 1-phenyl-2.3-dimethyl-4-amino-5-pyrazolone.

It is a known fact that 1-phenyl-2.3-dimethyl-4-aminio-5-pyrazolone is obtained by treating 1-phenyl-2.3-dimethyl-pyrazolone with nitrous acid, reduction of the resulting nitroso compound with bi-sulphite and splitting up of the sulphamino compound with acid.

I have found that for the manufacture of 1-phenyl-2.3-dimethyl-4-dimethylamino-5-pyrazolone it is not necessary to start from 1-phenyl-2.3-dimethyl-4-amino-5-pyrazalone, which is but difficultly obtained in pure form, but that the easily crystallizing sulphamino compound may be used. By treating 1-phenyl-2.3-dimethyl-4-sulphamino-5-pyrazolone with formaldehyde in the presence of formic acid the dimethylated compound is obtained and the sulpho group is split up at the same time. One obtains by this process a considerable reduction of labor and the 1-phenyl-2.3-dimethyl-4-dimethylamino-5-pyrazolone thus prepared is purer than that manufactured according to other processes and the yield is excellent.

The reaction is believed to take place as follows:

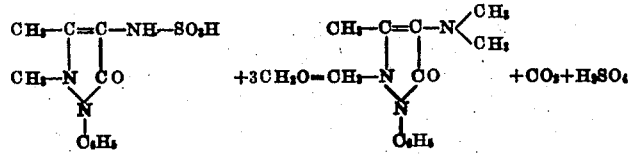

Example.

An aqueous solution of 1-phenyl-2.3-dimethyl-4-sulphamino-5-pyrazolone, obtained from 188 parts of 1-phenyl-2.3-dimethyl-pyrazolone, is slowly added, over a period of about ten hours, to a mixture of 213 parts of formaldehyde (36 per cent) and 150 parts of formic acid (80 per cent), which latter mixture is constantly stirred and kept at a temperature slightly above the boiling point. Thereafter the heating is continued for an hour, the end of the methylating process being indicated by the fact that carbonic acid no longer forms; any excess of formaldehyde may be recovered as a dilute solution.

After cooling the 1-phenyl-2.3-dimethyl-4-dimethylamino-5-pyrazolone is extracted from the methylating mixture by stirring with benzol and addition of an excess of sodium hydroxide solution. The further purification of the product thus obtained is performed in the usual manner.

I claim:

The process for the manufacture of 1-phenyl-2.3-dimethyl-4-dimethylamino-5-pyrazolone which consists in allowing formaldehyde in the presence of formic acid to act upon 1-phenyl-2.3-dimethyl-4-sulphamino-5-pyrazolone.

In witness whereof I have hereunto set my hand.

JULIUS HOFFMANN.

Witnesses:
WILLIAM GIRARD,
HENRY KUBLI.